United States Patent
Sundaramoorthy et al.

(10) Patent No.: US 11,586,582 B2
(45) Date of Patent: *Feb. 21, 2023

(54) DATA INGESTION SYSTEM

(71) Applicant: Bank of America Corporation, Charlotte, NC (US)

(72) Inventors: Thiruvadi Natarajan Sundaramoorthy, Charlotte, NC (US); Kenneth L. Gommel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/345,243

(22) Filed: Jun. 11, 2021

(65) Prior Publication Data

US 2021/0303514 A1 Sep. 30, 2021

Related U.S. Application Data

(63) Continuation of application No. 16/503,069, filed on Jul. 3, 2019, now Pat. No. 11,061,856.

(51) Int. Cl.
*G06F 16/11* (2019.01)
*G06F 16/22* (2019.01)
*G06F 16/174* (2019.01)

(52) U.S. Cl.
CPC ........ *G06F 16/116* (2019.01); *G06F 16/1744* (2019.01); *G06F 16/2282* (2019.01)

(58) Field of Classification Search
CPC . G06F 16/116; G06F 16/1744; G06F 16/2282
See application file for complete search history.

(56) References Cited

U.S. PATENT DOCUMENTS

| | | |
|---|---|---|
| 6,480,834 B1 | 11/2002 | Engle et al. |
| 6,513,048 B1 | 1/2003 | Engle et al. |
| 6,691,125 B1 | 2/2004 | Engle et al. |
| 6,886,160 B1 | 4/2005 | Lee |
| 7,996,411 B2 | 8/2011 | Yaeger |
| 8,010,905 B2 | 8/2011 | Ryan et al. |
| 8,214,517 B2 | 7/2012 | Dubnicki et al. |
| 8,266,148 B2 | 9/2012 | Guha et al. |
| 8,381,224 B2 | 2/2013 | Huetter et al. |
| 8,607,212 B2 | 12/2013 | Hoberman et al. |
| 8,732,213 B2 | 5/2014 | Sowell et al. |
| 8,788,464 B1 | 7/2014 | Lola et al. |

(Continued)

*Primary Examiner* — Kris E Mackes (57) ABSTRACT

A device automatically extracts a data file from an upstream source based on ingestion parameters. The data file is in a first format that is not readable by a downstream data analysis utility and includes a plurality of data records. Each record includes one or more entries. The ingestion parameters include a file identifier, transformation instructions, and storage instructions for the extracted data file. The device generates table(s) based on the extracted data file by, determining, based on the transformation instructions, a table in which to store each entry and a row and column of the determined table in which to store the entry. Entries are input into the determined tables, rows, and columns. The table(s) are stored in a second format that is readable by the downstream data analysis utility.

20 Claims, 4 Drawing Sheets

(56) References Cited

U.S. PATENT DOCUMENTS

| | | |
|---|---|---|
| 8,868,515 B2 | 10/2014 | Lee |
| 8,949,175 B2 | 2/2015 | Wu et al. |
| 9,324,022 B2 | 4/2016 | Williams, Jr. et al. |
| 9,582,528 B2 | 2/2017 | Furuhashi et al. |
| 9,858,322 B2 | 1/2018 | Theimer et al. |
| 9,866,635 B2 | 1/2018 | Maturana et al. |
| 9,959,324 B2 | 5/2018 | Dantressangle et al. |
| 9,990,383 B2 | 6/2018 | Brinnand |
| 10,055,426 B2 | 8/2018 | Arasan et al. |
| 10,108,707 B1 | 10/2018 | Chu et al. |
| 10,121,169 B2 | 11/2018 | Liu et al. |
| 10,122,783 B2 | 11/2018 | Qiao et al. |
| 10,169,077 B1 | 1/2019 | Sigl, Sr. |
| 10,192,250 B1 | 1/2019 | Christensen et al. |
| 10,270,796 B1 | 4/2019 | Veeraswamy et al. |
| 2012/0144157 A1 | 6/2012 | Crew et al. |
| 2014/0344211 A1* | 11/2014 | Allan .................... G06F 16/258 707/602 |
| 2015/0193243 A1 | 7/2015 | Varkhedi et al. |
| 2016/0253340 A1 | 9/2016 | Barth et al. |
| 2016/0299957 A1 | 10/2016 | A. C. et al. |
| 2017/0199896 A1 | 7/2017 | Sharma et al. |
| 2017/0200153 A1 | 7/2017 | Hewitt et al. |
| 2017/0206208 A1 | 7/2017 | Zhang et al. |
| 2017/0235762 A1 | 8/2017 | Sharpe et al. |
| 2018/0005274 A1 | 1/2018 | Calvillo et al. |
| 2018/0139103 A1 | 5/2018 | Guo et al. |
| 2018/0173812 A1 | 6/2018 | Agarwal et al. |
| 2018/0253344 A1 | 9/2018 | Deligia et al. |
| 2018/0300186 A1 | 10/2018 | Grantham |
| 2018/0314705 A1 | 11/2018 | Griffith et al. |
| 2018/0329644 A1 | 11/2018 | Das et al. |
| 2019/0057122 A1 | 2/2019 | Kapulovskaya et al. |
| 2019/0073373 A1 | 3/2019 | Surale et al. |
| 2019/0108586 A1 | 4/2019 | Jayaram et al. |
| 2019/0121681 A1 | 4/2019 | Kelosky et al. |
| 2020/0026711 A1* | 1/2020 | Blom .................. G06F 16/9024 |
| 2021/0004350 A1 | 1/2021 | Sundaramoorthy et al. |

\* cited by examiner

DATA INGESTION SYSTEM

CROSS-REFERENCE TO RELATED APPLICATIONS

This application is a continuation of U.S. patent application Ser. No. 16/503,069 filed Jul. 3, 2019, by Thiruvadi Natarajan Sundaramoorthy et al., and entitled "DATA INGESTION SYSTEM," which is incorporated herein by reference.

TECHNICAL FIELD

The present disclosure relates generally to data ingestion. More particularly, in certain embodiments, the present disclosure is related to a data ingestion system.

BACKGROUND

A data source may store information in data files which may have a variety of formats. For instance, an entity may store records of transactions with customers or clients in a data repository. Generally these records are stored in a file format that is dictated by the particular tools available to the entity, resulting in data files with a variety of formats. Modern techniques of data analysis are increasingly available for the analysis of large data sets. For instance, so-called big data analysis can be used for the statistical analysis of large sets of data. There exists a need for improved tools for ingesting source data in a manner that facilitates effective analysis using these analysis techniques.

SUMMARY

Currently, there is a lack of tools for automatically ingesting upstream source files into an appropriate table or database format for efficient downstream analysis (e.g., for big data analysis). Existing data ingestion tools have a limited ability to effectively and efficiently ingest source data in a manner that facilitates effective analysis using these data analysis tools. For instance, existing systems generally fail to account for the variety of data types present within source data and do not provide sufficient checks for data quality during the ingestion process. These systems are, thus, susceptible to both creating data quality errors during data ingestion and perpetuating existing errors that were present in the original source data. Data quality errors degrade system performance because system resources are consumed while attempting to analyze the incorrectly prepared data. Accordingly, these approaches waste processing resources while also limiting the value of any downstream analysis that is performed. As such, the present disclosure encompasses the recognition of a need for improved tools for automatically ingesting upstream files (e.g., mainframe files) into an appropriate database structure and format for incorporation into modern data analysis pipelines (e.g., for big data analysis).

In one embodiment, a device automatically extracts a data file from an upstream source based on ingestion parameters. The data file is in a first format that is not readable by a downstream data analysis utility and includes a plurality of data records. Each record includes one or more entries. The ingestion parameters include an identifier, validation criteria, transformation instructions, and storage instructions for the extracted data file. The validation criteria include one or more criteria or rules associated with whether each of the plurality of data records is permitted to be ingested. The transformation instructions include one or more parameters for transforming the extracted data file into one or more data tables (e.g., for storage in a downstream database). The storage instructions include one or more parameters for storing the one or more data tables in a second format that is readable by the downstream data analysis utility. The device generates the one or more tables based on the extracted data file by, determining, based on the validation criteria, whether the record is permitted to be ingested. The device determines, based on the transformation instructions, a table in which to store each entry and a row and column of the determined table in which to store the entry. Entries are input into the determined tables, rows, and columns. The one or more tables are stored (e.g., in a database) in a second format that is readable by the downstream data analysis utility.

The system described in the present disclosure provides a technical solution to the technical problems of previous systems, including those discussed above, by facilitating the efficient and automatic ingestion of an upstream data file. The disclosed system provides several advantages which include 1) efficient and effective generation of one or more tables from an upstream data file with decreased processing costs, 2) identification of errors or data quality issues in the upstream data file during its ingestion, and 3) automatic identification and/or correction of these errors or data quality issues during the ingestion process. As such, the system described in the present disclosure may improve the function of computer systems used to ingest data files by providing an efficient framework for ingesting upstream data files into an appropriately formatted and structured table or database. The system may also reduce or eliminate data quality issues. The table(s) generated by the system facilitate efficient downstream analysis of the information stored in the upstream file, which otherwise could not be effectively analyzed using previously available technology. The system described in the present disclosure may particularly be integrated into a practical application for the automatic ingestion of binary mainframe files, which are otherwise not amenable to automatic ingestion via conventional approaches.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
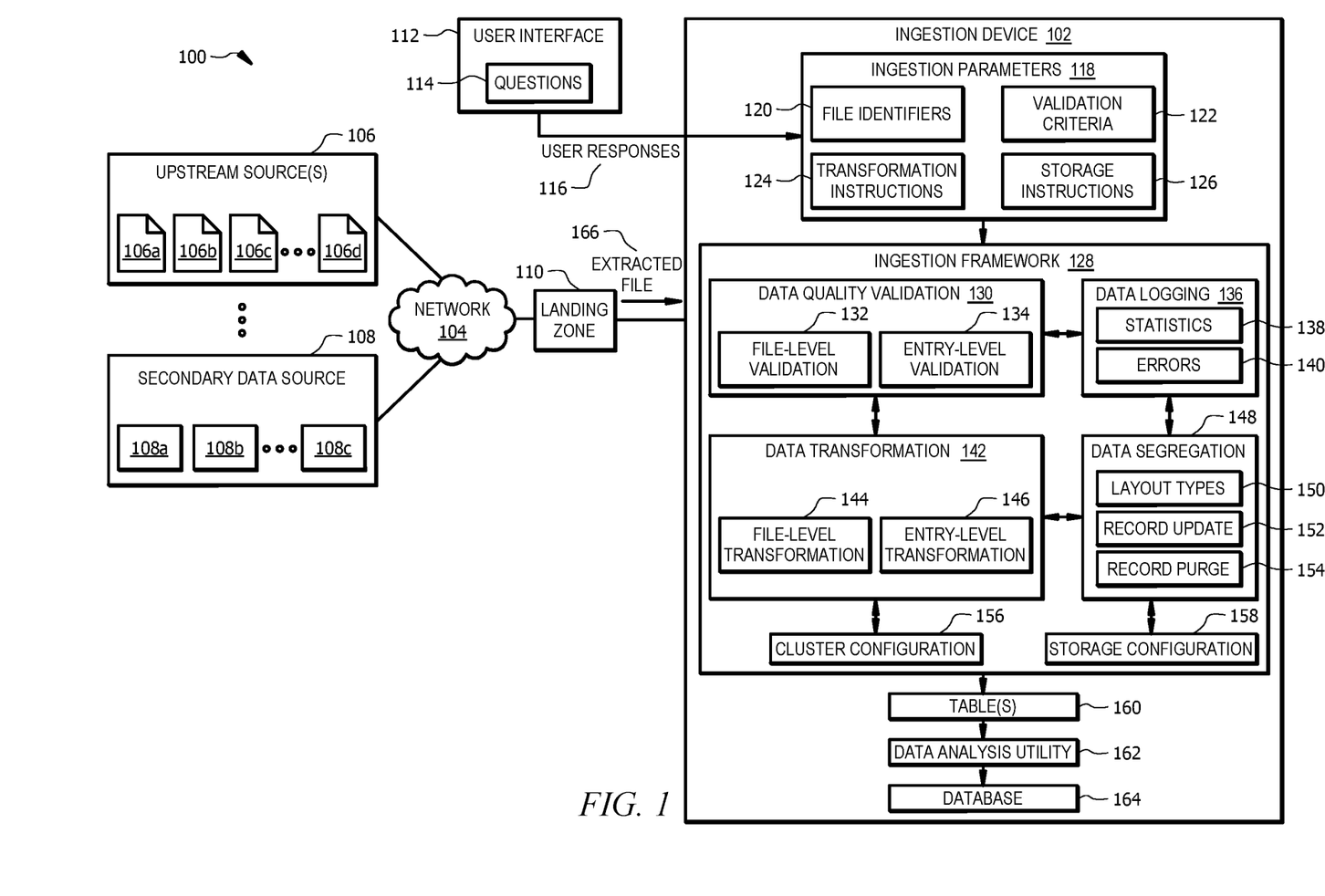
FIG. 1 is a schematic diagram of a data ingestion system, according to an illustrative embodiment of the present disclosure.
Figure 2:
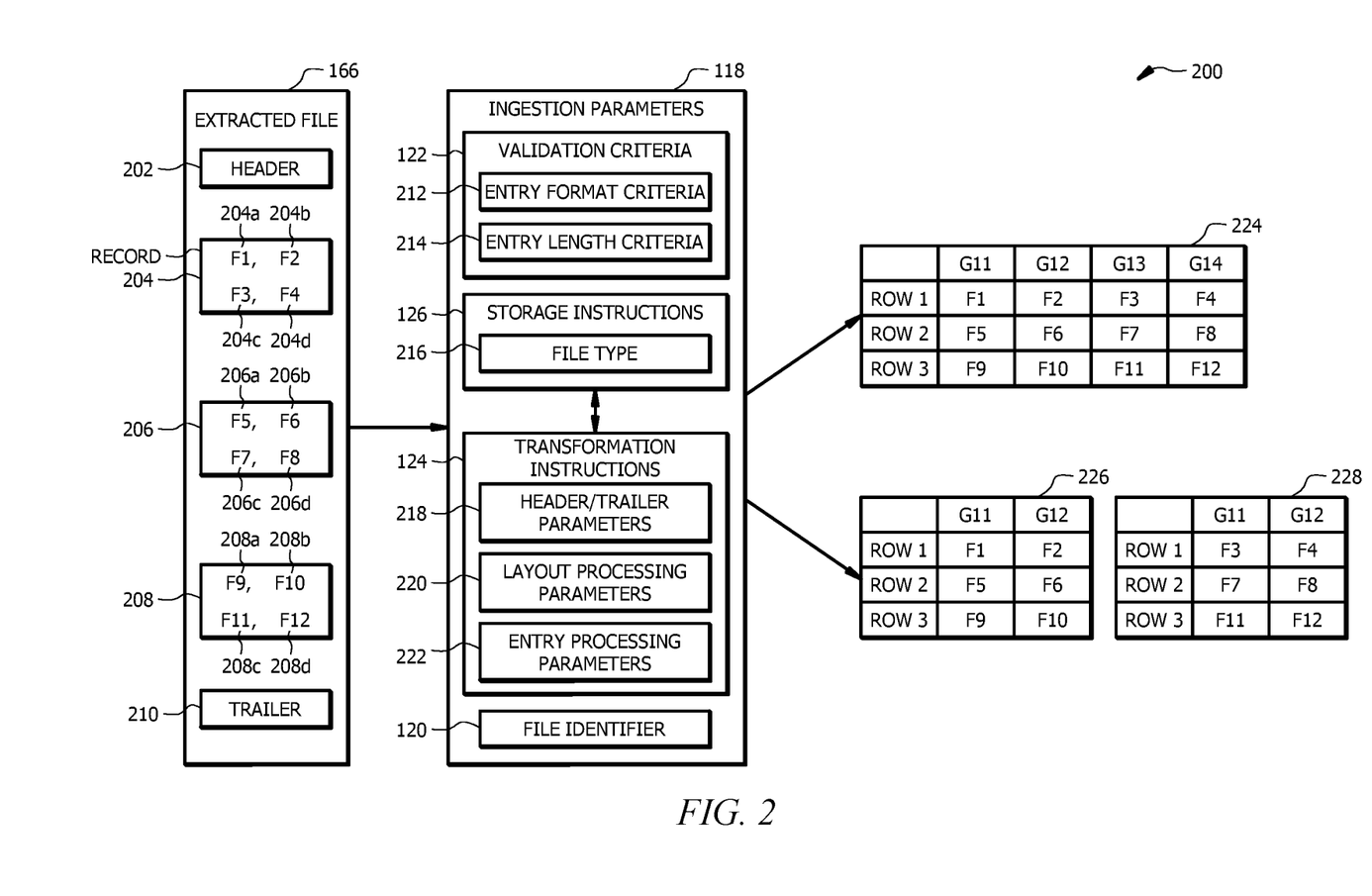
FIG. 2 is a flow diagram illustrating the transformation of an extracted data file into one or more data tables using the system of FIG. 1.
Figure 3:
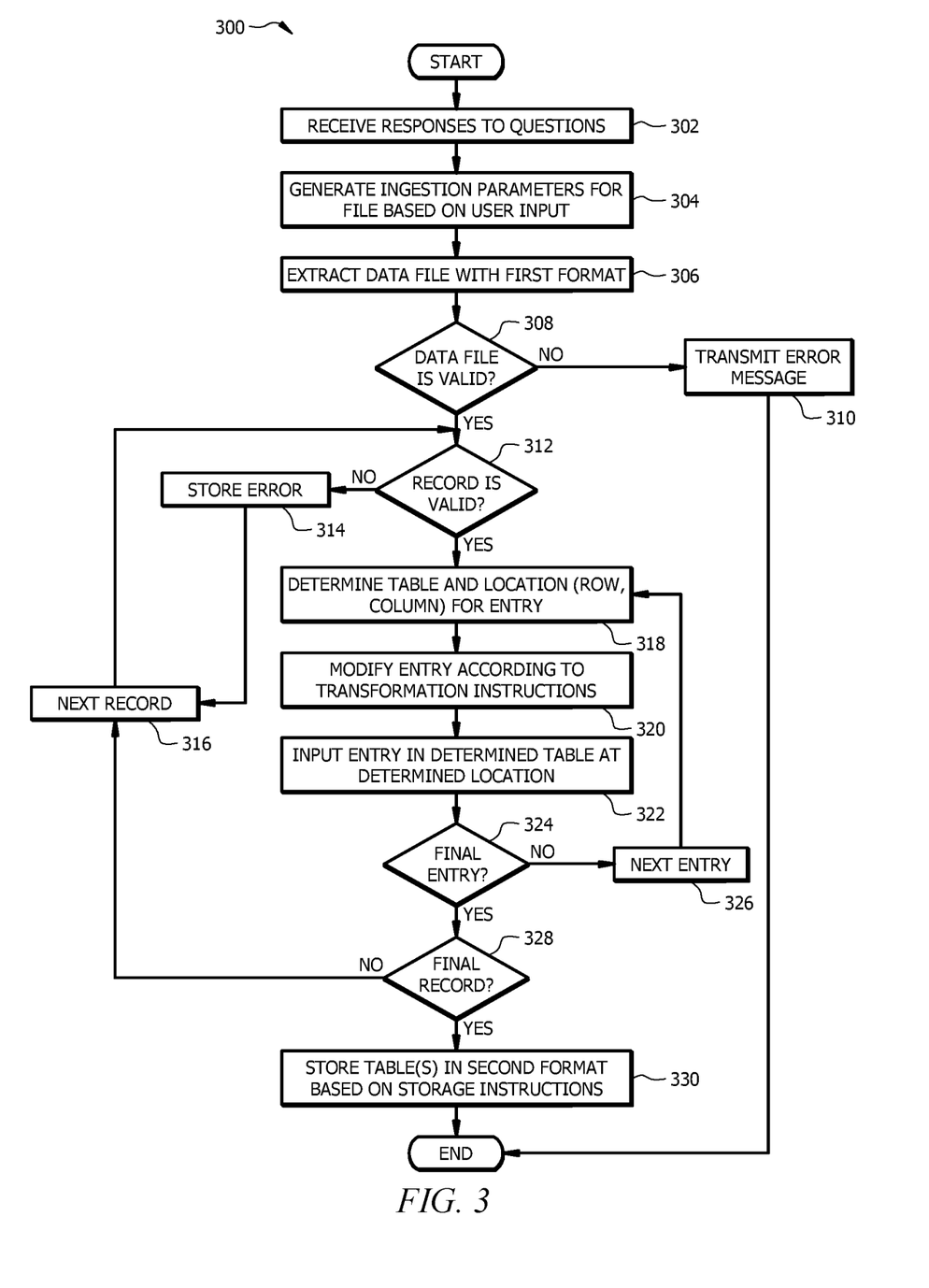
FIG. 3 is a flowchart of a method for operating the example data ingestion system illustrated in FIG. 1.
Figure 4:
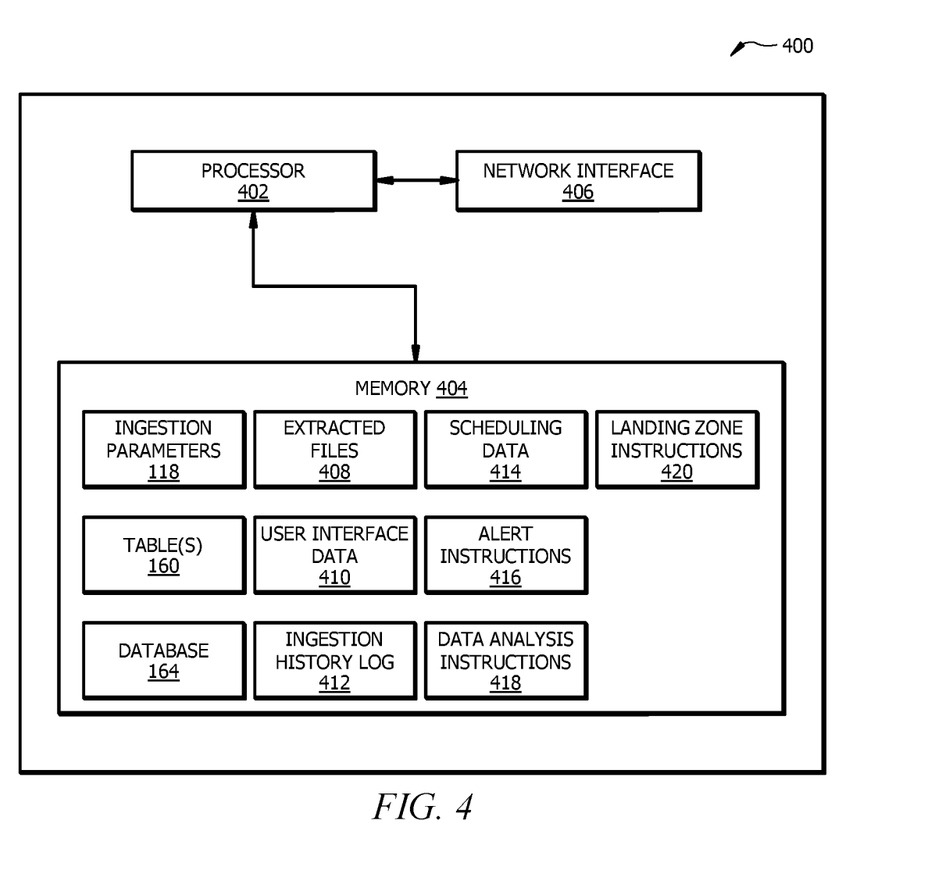
FIG. 4 is an embodiment of a device configured to implement the data ingestion system of FIG. 1.

FIG. 1 is an example of a data ingestion system 100 configured to automatically ingest a data file. FIG. 2 illustrates the generation of one or more data tables based on an extracted data file 166. FIG. 3 illustrates a method for operating the data ingestion system 100 of FIG. 1. FIG. 4 is an example of a device configured to implement the data ingestion system 100 of FIG. 1 and the method of FIG. 3.

FIG. 1 is a schematic diagram of a data ingestion system 100, according to an illustrative embodiment of the present disclosure. The data ingestion system 100 is generally configured to automatically ingest at least one upstream data file (e.g., one or more of files 106a-d from upstream source(s) 106) for analysis using a downstream data analysis utility 162. More particularly, the data ingestion system 100 provides the ability to automatically extract a data file 106a-d (i.e., as extracted file 166) and, based, on a set of ingestion parameters 118, generate one or more tables 160 that are readable and appropriately formatted for analysis using the data analysis utility 162 and for storage in a downstream database (e.g., database 164).

Data Ingestion Device

The data ingestion system 100 includes the data ingestion device 102, a network 104, an upstream file source 106, a secondary data source 108, a landing zone utility 110, and a user interface 112. The data ingestion system 100 may be configured as shown or in any other suitable configuration. Examples of the data ingestion system 100 in operation are described in FIG. 2 and FIG. 3.

The data ingestion device 102 is a computing device configured to collect (e.g., extract) an extracted data file 166 from the upstream data source 106 and generate one or more tables 160 based on the extracted data file 166, using a set of ingestion parameters 118. In general, the data ingestion device 102 may be a standalone device or a distributed device (e.g., executed on a distributed server or as a cluster of devices). The data ingestion device 102 may be implemented using the hardware, memory and interfaces of device 400 described with respect to FIG. 4 below.

The ingestion parameters 118 include an identifier 120 of the extracted data file 166. Identifier 120 may include a name and file location of the extracted data file 166 (e.g., in the upstream source 106). As such, the identifier 120 may be used by the data ingestion device 102 to extract the file 166 of interest that is associated with the file identifier 120. The extracted data file 166 generally includes a plurality of data records, and each record includes one or more entries (e.g., as described in greater detail below with respect to FIG. 2). The extracted data file 166 is in a format that is not readable by the downstream data analysis utility 162. For example, the extracted data file 166 may be a compressed mainframe file, a position-based file, a comma-delimited file, or a tab-delimited file. The extracted data file 166 may correspond to one or more of the upstream files 106a-d from upstream source 106.

The ingestion parameters 118 also include validation criteria 122 for the extracted data file 166. The validation criteria 122 generally include one or more criteria or rules associated with whether each of the plurality of data records of the extracted file 166 is permitted to be ingested. For instance, the validation criteria 122 may include one or more criteria or rules associated with whether each of the plurality of data records of the extracted data file 166 is permitted to be ingested. The validation criteria 122 are described in greater detail below, with respect to FIG. 2.

The ingestion parameters 118 include transformation instructions 124 for the extracted data file 166. The transformation instructions 124 generally include one or more parameters for transforming the extracted data file 166 into the data table(s) 160. For example, the transformation instructions 124 may include instructions for formatting the table(s) 160 and for transforming individual entries of the extracted data file 166 into corresponding, and appropriately formatted entries, in particular locations (i.e., rows and columns) of the table(s) 160. The transformation instructions 124 are described in greater detail below, with respect to FIG. 2.

The ingestion parameters 118 also include storage instructions 126 for the extracted data file 166. The storage instructions 126 generally include one or more parameters for storing the one or more data tables 160 in a format that is different than that of the extracted data file 166 and that is readable by the downstream data analysis utility 162. Generally the format in which table(s) 160 is/are stored is also compatible with storage in the downstream database 164. Examples of using the ingestion parameters 118 to transform the extracted data file 166 into table(s) 160 are described in greater detail below with respect to FIG. 2 and FIG. 3.

Data Ingestion Framework

As shown in the example of FIG. 1, the data ingestion parameters 118 may be used to implement a data ingestion framework 128 configured to appropriately validate the extracted data file 166, transform the extracted data file 166 into one or more tables 160, and store the one or more tables 160 in a format that is readable by the downstream analysis utility 162. For instance, the ingestion framework 128 may include data quality validation layer 130, a data logging layer 136, a data transformation layer 142, a data segregation layer 148, a cluster configuration layer 156 and a storage configuration layer 158. Each of the layers 130, 136, 142, 148, 156, and 158 generally implements functions associated with corresponding ingestion parameters 118, as described below. Information from each of layers 130, 136, 142, 148, 156, and 158 may be transferred to any other layer, as illustrated in FIG. 1. Each of layers 130, 136, 142, 148, 156, and 158 may include and/or be configured using ingestion parameters 118.

The data quality validation layer 130 generally determines, using the validation criteria 122, the quality of the extracted data file 166 (e.g., in order to determine whether the extracted data file 166 is valid for generating the table(s) 160). The data quality validation layer 130 performs file-level validations 132 and entry-level validations 134. For instance, file-level validations 132 may employ validation criteria 122 to determine whether the extracted data file 166 satisfies certain predefined file criteria. For example, the file-level validations 132 may be associated with whether the header (e.g., header 202 of FIG. 2) and/or trailer (e.g., trailer 210 of FIG. 2) of the extracted data file 166 satisfy predefined criteria, which are based on and/or include the validation criteria 122. The predefined criteria may be associated with a length of information stored in the header and/or trailer (e.g., whether there is greater than a minimum number of characters in the header and/or trailer, whether there is less than a maximum number of characters stored in the header and/or trailer, or the like). A file-level validation 132 may be a determination, based on the validation criteria 122, of whether there is greater than a minimum number of records and/or less than a maximum number of records in the data file 166. A file-level validation 132 may be a determination, based on the validation criteria 122, of whether the number of entries (e.g., entries 204a-d, 206a-d, and/or 208a-d of FIG. 2) in a record satisfies similar minimum and/or maximum values.

The entry-level validations 134 may be associated with a determination of whether individual (or sets) of entries of the extracted data file 166 (e.g., entries 204a-d, 206a-d, and/or 208a-d of FIG. 2) satisfy certain criteria associated with the length of the entries and/or the types (e.g., the format) of the entries. For instance, an entry-level validation 134 may be a determination of whether there is greater than a minimum number of characters in the entry and/or whether there is less than a maximum number of characters in the entry. An entry-level validation 134 may also or alternatively be a determination of whether an entry satisfies predefined formatting criteria associated with the type of the entry. For example, a predefined criteria associated with date entries in the extracted file 166 may indicate that dates should have a format of the type "MM/DD/YYYY." The data validation data would, thus, determine that a date entry of "MM/DD/YYYY" is valid, while a data of "Month DD, YYYY" is not valid. As described below, an invalid entry may be transformed based on the transformation instructions 124 (e.g., by the data transformation layer 142) such that the corresponding entry written in table(s) 160 conforms with validation criteria 122.

The data logging layer 136 generally maintains a log of information related to files (including but not limited to extracted file 166) ingested by the data ingestion device 102. The data logging layer 136 may, for example, calculate and store statistics 138 related to ingested data files, including but not limited to the extracted file 166. For example, the statistics 138 may be related to the number of files ingested, the rate of invalid files and/or entries identified by data quality layer 130, the number or type of transformations performed by data transformation layer 142 (i.e., using the transformation instructions 124), and the types of files stored by the storage configuration layer 158 (i.e., using the storage instructions 126). The data logging layer 136 may also include a record of errors 140 detected by the data ingestion device 102. For instance, the errors 140 may include errors associated with invalid files, errors associated with entries which were not correctable using the transformation instructions 124, and any other system errors (e.g., related to receipt of a corrupted file, loss of network connectivity, or the like). An error message may be triggered based on the detection of an error or the determination that an error count has exceeded a predefined threshold value. The error message may, for example, be transmitted as a notification (e.g., via electronic communication or any other appropriate communication mechanism) to an administrator the data ingestion device 102.

The data transformation layer 142 generally determines, based on the transformation instructions 124, how the extracted data file 166 should be transformed to generate the table(s) 160 in an appropriate format for effective analysis by the downstream data analysis utility 162. The data transformation layer 142 may perform file-level transformations 144 and/or entry-level transformations 146. The file-level transformations 144 may be associated with changing the file type of the extracted file 166 (e.g., from a DOS file type to a UNIX file type). The entry-level transformations 146 may be associated converting the type or format of each entry of the extracted data file 166. For example, as described in the example above, an entry for a date may be transformed from a first format that cannot be used by the downstream data analysis utility 162 (e.g., a format of "Month, DD, YYYY") to a second format that can be analyzed by the downstream data analysis utility 162 (e.g., a format of "MM/DD/YYYY"). In some cases, entry-level transformations 146 may facilitate the decompression of compressed entries. For example, a mainframe file may include entries in a compressed format, and the entry-level transformations 146 may be used to decompress each of the compressed entries to create a corresponding decompressed entry for the compressed entry.

In some cases, an entry in the extracted file 166 may not obviously conform to a known entry type. In such cases, the entry-level transformations 146 may facilitate the derivation of appropriate entries that are readable by the downstream data analysis utility 162. For instance, a binary string in an extracted mainframe file may correspond to a compressed date entry, and the transformation instructions 124 may include information which may be used to decompress the binary entry and derive a date corresponding to the binary entry (e.g., the information may correspond to the entry processing parameters 222 of FIG. 2, described below). The compressed entry may be decompressed prior to the derivation of a corresponding related entries. For example, a compressed entry may be converted from its original compressed format (e.g., with a compressed entry size of 5 bytes) to second decompressed format (e.g., with a decompressed entry size of 10 bytes). In some embodiments, an entry in the extracted data file 166 (e.g., after any appropriate decompression, as described above) may be used to generate a new related entry based on the transformation instructions 124. For example, a conditional parameter of the transformation instructions 124 may be used to generate a new entry that describes an original entry of the extracted file 166. For example, as defined in the transformation instructions 124, entries with a character count of less than ten may be considered "short" entries, while entries with a character count of greater than or equal to ten may be considered "long" entries. Accordingly, for a first entry with a character count of twelve, the transformation layer 142 may derive, based on the transformation instructions 124, a new entry of "long", which may be stored in table(s) 160 and associated with the first entry (e.g., placed in a column and row with an established relationship with the first entry).

The data segregation layer 148 generally determines, based on the transformation instructions 124, how information should be properly segregated or dispersed amongst the one or more tables 160, such that the table(s) 160 may be efficiently and effectively analyzed using the downstream data analysis utility 162. The data segregation layer 148 may send and/or receive information to/from the data transformation layer 142 to ensure the table(s) are generated with an appropriate layout according to the transformation instructions 124. For example, the data segregation layer 148 may use the data transformation instructions 124 to determine a predetermined layout type 150 for the table(s) (e.g., a number of tables to include in table(s) 160, e.g., a type of information to store in given rows/columns of table(s) 160). For example, the data segregation layer 148 may determine whether the data in the extracted file 166 should be grouped into a single table (e.g., table 224 of FIG. 2) or segregated into multiple tables (e.g., tables 226 and 228 of FIG. 2).

The data segregation layer 148 may also facilitate table updates 152 and table purges 154. For example, if a table 160 exists that is based on a previous version of the extracted data file 166, this table may be updated based on a newer version (e.g., a more recently acquired version) of the extracted data file 166. In some embodiments, the entire table 160 is replaced with a new version of the table 160 that is based on the new extracted data file 166. In other embodiments, the existing table 160 is updated based on changes between the previous and new versions of the extracted data file 166. In some cases, it is more efficient to update the table 160 rather than generating an entire new table or database based on the more recent extracted data file 166. However, in some cases, it may be preferred to generate a new table 160, rather than using a previous version of the table 160 as a starting point. Purges 154 can be performed to remove information from the table 160 which may no longer be needed. For example, the data segregation layer 148 may determine if a record of table 160 is older than a threshold age (i.e., that a date associated with the record corresponds to a date before a threshold date). If the record is older than the threshold age, the record may be purged (i.e., removed) from the table 160, thereby facilitating the efficient removal of information that is no longer needed in table 160.

The cluster configuration layer 156 generally provides information associated with how the downstream data analysis utility should be configured for analysis of the generated table(s) 160. For example, the cluster configuration layer 156 may include analysis configuration parameters and parameters for implementing the analysis in a computer cluster (e.g., for "big data" analysis).

The storage configuration layer 158 generally implements functions of the ingestion device 102 associated with the storage instructions 126. For example, the storage configuration layer 158 may determine, based on the storage instructions 126, an appropriate format for the table(s) (i.e., such that the table(s) 160 are readable by the downstream data analysis utility 162) and cause the data ingestion device 102 to store the table(s) 160 in this appropriate file or database format. The storage configuration layer 158 may pass storage-related information to the data segregation layer 148, data transformation layer 142, and/or any other layer as appropriate to ensure that the table(s) 160 are readable by the downstream data analysis utility 162.

As described above, the table(s) 160 are generated by the data ingestion device 102, based on the ingestion parameters 118 and/or the corresponding ingestion framework 128. The table(s) 160 may include one or more tables of any appropriate format that is readable by the downstream data analysis utility 162 and is storable in the downstream database 164. The table(s) 160 generally include at least a portion of the data stored in the extracted data file 166. As described above, the table(s) 160 may also include information (i.e., as entries in appropriate rows and columns of the table(s) 160) that is derived from the extracted data file 166 using the ingestion parameters 118. Certain entries (e.g., entries determined to be invalid or associated with data quality errors) may be excluded from the table(s) 160.

The downstream data analysis utility 162 may be any utility, comprising software and/or hardware for analyzing table(s) 160. For instance, the downstream data analysis utility 162 may be a cluster-computing tool (i.e., comprising hardware and/or software) for analysis of table(s) 160. A cluster computing tool may be, for example, a distributed server configured for big data analysis. The downstream data analysis utility 162 may be configured based on information provided by the cluster configuration layer 142. The downstream database 164 may be any database or database platform (i.e., comprising hardware and/or software) for storing the table(s) 160 and, optionally, analysis results from the downstream data analysis utility 162. While in the example of FIG. 1, each of the downstream data analysis utility 162 and the downstream database 164 are illustrated as part of the data ingestion device 102, it should be understood that one or both of these components may be implemented as separate devices that are communicatively connected (e.g., either directly through wired or wireless communication, e.g., via network 104) to the data ingestion device 102.

Network, File Source(s), and Landing Zone

Network 104 facilitates communication between and amongst the various components of the data ingestion system 100. This disclosure contemplates network 104 being any suitable network operable to facilitate communication between the components of the system 100. Network 104 may include any interconnecting system capable of transmitting audio, video, signals, data, messages, or any combination of the preceding. Network 104 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The upstream file source 106 includes one or more sources (e.g., repositories) of upstream files 106a-d. Each of the upstream files 106a-d may be any file type that is not readable by the downstream data analysis utility 162. For instance, upstream files 106a-d may include compressed mainframe files, position-based files, comma-delimited files, and/or tab-delimited files, amongst others. The secondary data source 108 includes one or more sources (e.g., repositories) of secondary data 108a-c, which may also or alternatively be extracted by the data ingestion device 100 and included in table(s) 160. For instance, secondary data 108a-c may correspond to databases of additional information for storing in table(s) 160 and/or for analysis by the downstream data analysis utility 162. Generally, secondary data 108a-c may be in a format that is or is not readable by the downstream data analysis utility 162.

The landing zone 110 is any tool (i.e., comprising software and/or hardware) that facilitates the extraction and migration of the one or more the upstream data files 106a-d and, optionally, information from the secondary data 108a-c for extraction to the ingestion device 102. The landing zone 110 may be a separate utility or device, as shown in FIG. 1, or it may be included as a component of the data ingestion device 102, as appropriate for a given application. The landing zone 110 may be implemented using the hardware, memory and interfaces of device 400 described with respect to FIG. 4 below.

User Interface

In some embodiments, the ingestion parameters 118 are generated and associated with the extracted data file 166, based on user input (i.e., user responses 116 to questions 114) provided in the user interface 112. The user interface 112 may be presented on a display of a device communicatively coupled to the data ingestion device 102. Alternatively, the user interface 112 may be implemented by the data ingestion device 102 itself (e.g., displayed in a display of the ingestion device 102). The user input generally includes user responses 116 to questions 114, which are presented in the user interface 112. The questions 114 are associated with content of the extracted data file 166 and the intended structure and format of the table(s) 160 to be generated.

The questions 114 may include one or more questions related to the identity of the upstream data source 106 and/or the identity of the data file (e.g., of the upstream files 106a-d) to extract as extracted data file 166. For example, one of questions 114 may be "What is the name of the upstream data source?", or something similar. Questions 114 may be related to the type of the upstream source 106 and/or a version of the upstream data source 106. Questions 114 may be related to how the file 166 should be extracted from the upstream data source 106 (e.g., whether the extraction is or is not part of a "pull" from the data source 106). For example, a question 114 may be "What is the file name of the file to be extracted?", or something similar. Questions 114 may be related to the type of the file that is extracted. For instance, questions 114 may be related to whether the file is a text-only file, a binary file, a mainframe file and/or whether the file is a delimiter-based file (e.g., a comma delimited file, a tab-delimited file, etc.). Questions 114 may be related to whether the file to be extracted as extracted file 166 contains data in a compressed and/or packed format. Responses 116 to the example questions 114 described above may be used to generate the file identifier 120 of the ingestion parameters 118.

In some embodiments, the questions 114 displayed in the user interface are determined based on responses 116 to previously presented questions 114. For instance, if a response to a question 114 identifies the file 166 to be extracted as a delimiter-based file, a series of questions 114 related to the delimiter pattern of the file 166 and/or the layout type of the file may be displayed. For instance, questions 114 may be related to what the delimiter pattern of the file is (i.e., what character denotes a separation between field or entry values in the file 166). A question 114 may also be presented to determine whether the upstream file 106a-d to be extracted is a multiple-layout (e.g., multi-layout) file. In a multiple-layout file, different portions or regions of the file store information using a different layout. The layout generally refers to the pattern of the stored information (e.g., the number of entries stored in each region and how different entries are distinguished, e.g., using a tab, a comma, etc.). If the file 166 is a multiple-layout file, one or more questions 114 related to the number of layouts may be presented. If it is not a multiple-layout file, one or more questions 114 may be presented related to the number of fields in each row of the delimiter-based file. Responses 116 to these example questions 114 may be used to generate validation criteria 122 and/or transformation instructions 124 of the ingestion parameters 118.

Alternatively, if a response to a question 114 identifies the file 166 to be extracted as not being a delimiter-based file, a different series of questions 114 may be displayed in the user interface 112. For example, a question 114 may be related to the length of records in the file (e.g., a length row records in the file). Questions 114 may be related to identifying possible errors in the extracted data file 166. For example, questions 114 may include one or more questions related to a file error threshold limit (e.g., to define an error tolerance beyond which an extracted file 166 will not be processed). Responses 116 to these example questions 114 may also be used to generate validation criteria 122 and/or transformation instructions 124 of the ingestion parameters 118.

Further questions 114 may be related to how to appropriately transform the extracted file 166 to generate table(s) 160 with desired properties for effective downstream analysis. For instance, questions 114 may be presented related to the pattern used to identify the layout of the file 166. For example, responses 116 to these questions 114 may provide information about a predetermined character (such as "FRE") that indicates that associated entries should be stored in related rows of the table(s) 160. Questions 114 may be related to the position of each field in the file, and the type of information stored in each field. For instance, responses 116 to these questions 114 may provide information about whether the fields store general text, a particularly formatted date entry (e.g., YYYYMMDD or DD/MM/YYYY), or a value with a particular level of precision (i.e., with a predefined number of decimal values). Responses 116 to these example questions 114 may be used to generate validation criteria 122 and/or transformation instructions 124 of the ingestion parameters 118.

Questions 114 may be related to whether the file to be extracted as extracted file 166 includes a header and/or trailer (e.g., header 202 and/or trailer 210 of FIG. 2). If the file 166 includes a header and/or trailer, further questions 114 may be presented related to, for example, 1) whether the header/trailer information should be included or excluded during ingestion; 2) the number of header records; 3) the number of trailer records; and 4) a pattern (e.g., a delimiter pattern) for identifying the start and end positions of the header and/or trailer. Further questions 114 may be related to how the header and/or trailer should be ingested to generate table(s) 160. For instance, questions 114 may be related to the number of header/trailer fields or entries. For each header/trailer field, questions 114 may be presented to determine the position of the field in the header/trailer and the type of data stored in the field. For instance, responses 116 to these questions 114 may provide information about whether the fields store general text, a particularly formatted date entry (e.g., YYYYMMDD or DD/MM/YYYY), or a value with a particular level of precision (e.g., with a predefined number of decimal values). Responses 116 to these example questions 114 may be used to generate validation criteria 122 and/or transformation instructions 124 of the ingestion parameters 118.

Questions 114 may be related to the scheduling of automatic extraction of the data file in the future. For instance, questions 114 may be related to the processing frequency (e.g., daily, weekly, biweekly, monthly) or specific days and/or times when a file should be ingested. Responses 116 to schedule-related questions 114 may be used to generate scheduling data (e.g., data 414 described with respect to FIG. 4 below), which facilitate automatic data ingestion on a predefined schedule.

In an example operation of the data ingestion system 100, one or more of the upstream files 106a-d are automatically extracted as extracted file 166 (e.g., using landing zone 110 to facilitate extraction of the file 166). FIG. 2 illustrates an example operation of the data ingestion device 102, whereby an extracted file 166 is ingested, using ingestion parameters 118, to generate table(s) 160, which include one or more of the tables 224, 226, 228. The example extracted data file 166 includes a header 202, a plurality of records 204, 206, 208, and a trailer 210. Each of the records 204, 206, 208 includes a plurality of fields or entries 204a-d, 206a-d, 208a-d, respectively. Each of the entries 204a-d, 206a-d, 208a-d may correspond, for example, to alphanumeric strings stored in the corresponding record 204, 206, 208. In some cases, a record separator denotes the separation between each record 204, 206, 208.

As described above, ingestion parameters 118 include a file identifier 120, validation criteria 122, transformation instructions 124, and storage instructions 126. The file identifier 120 corresponds to the identity (e.g., file name and location) of the extracted data file 166. The validation criteria 122 include entry format criteria 212 and/or entry length criteria 214. The entry format criteria 212 may correspond to rules or criteria associated with how entries in the file 166 should be formatted. For instance, an entry format criteria 212 may specify a required format for a date entry in the file 166. The entry length criteria 214 may correspond to minimum and/or maximum lengths (e.g., character counts) of the entries 204.

The transformation instructions 124 may include header parameters 218, layout processing parameters 220, and/or entry processing parameters 222. For example, the header/trailer parameters 218 may include instructions for modifying information stored in the header 202 and/or trailer 210 of file 166. The layout processing parameters 220 may include instructions for interpreting and/or modifying the layout of the file 166. For instance, the layout processing parameters 220 may inform the ingestion device 102 of how to distinguish between the individual records 204, 206, 208. The entry processing parameters 222 may include instructions for interpreting and/or modifying the entries 204a-d, 206a-d, and/or 208a-d. For instance, the entry processing parameters 222 may inform the ingestion device 102 of how to distinguish between the individual entries 204a-d, 206a-d, 208a-d in records 204, 206, 208.

The storage instructions 126 may include approved file/database types 216 that are compatible with the downstream data analysis utility 162 and the downstream database 164. As described in greater detail herein, in some embodiments, these ingestion parameters 118 may be generated based on responses 116 provided in user interface 112.

Generally, the data ingestion device 102 uses the data ingestion parameters 118 to generate one or more of the tables 224, 226, and/or 228 from the extracted file 166, as illustrated in FIG. 2. The data transformation instructions 124 may be used to determine how entries 204a-d, 206a-d, 208a-d from the extracted file 166 are partitioned into these tables 224, 226, and/or 228 and entered into the appropriate rows and columns of these tables 224, 226, and/or 228 for efficient and effective downstream analysis. In some embodiments, the ingestion parameters 118 may be configured such that each of the entries 204a-d, 206a-d, 208a-d are input (i.e., in their original form or with any appropriate modifications) into the single table 224. For some applications, a single data table (such as table 224) is preferred or required for proper analysis by a downstream data analysis utility 162. However, in other embodiments, the ingestion parameters 118 may be configured such that each of the entries 204a-d, 206a-d, 208a-d are input (e.g., in their original form or with any appropriate modifications) into separate tables 226 and 228. In some cases, this multiple-table structure (i.e., illustrated by tables 226 and 228) is more amenable to effective and efficient analysis by the downstream analysis utility 162 and/or storage in the downstream database 164. Accordingly, the data ingestion parameters 118 facilitate the efficient and automatic partitioning of entries 204a-d, 206a-d, 208a-d from the extracted file 166 into an appropriate table structure for improved downstream analysis.

As described above, in some embodiments, the ingestion parameters 118 may be generated and associated with the extracted data file 166, based on responses 116 provided in the user interface 112. For example, a user may access the user interface 112 to provide responses 116 to questions 114. Responses 116 may correspond to the upstream data file 106a-d to extract as extracted file 166, information about how information is organized in the extracted data file 166 (e.g., based on a delimiter or other storage pattern), information about the type of data stored in each field or entry of the data file 166, and/or information about the intended structure of table(s) 160. Generally, questions 114 are presented until all information is collected for generating the ingestion parameters 118 for the extracted data file 166. Once the ingestion parameters 118 are established for a give upstream file 106a-d, the file can generally be ingested to generate and/or update table(s) 160 automatically (e.g., on a predefined schedule). This facilitates the efficient analysis of information in upstream files 106a-d, which would otherwise not be available using previous approaches.

Responses 116 may be received by the ingestion device 102 and used to generate ingestion parameters 118. For instance, responses 116 to questions 114 related to the identity and location of the extracted data file 166 in the upstream source 106 may be used to generate the file identifier 120. Validation criteria 122 may be based, for example, on responses 116 to questions 114 related to whether the file 166 is of an appropriate file type, whether records 204, 206, 208 have an appropriate format, whether records 204, 206, 208 include an appropriate number of entries 204a-d, 206a-d, 208a-d, whether entries 204a-d, 206a-d, 208a-d are of an appropriate length, and/or whether entries 204a-d, 206a-d, 208a-d are appropriately formatted for use in the downstream data analysis utility 162. Transformation instructions 124 may be based on responses 116 to questions 114 related to how the file or entries of the file should be modified to conform with requirements of the downstream data analysis utility 162. For example, responses 116 to questions 114 related to file or database formats that are supported by the downstream data analysis utility 162 may be used to generate the storage instructions 126. In general, a single response 116 may provide information for generating more than one ingestion parameter 118. For instance, a response 116 indicating a required format of an entry may be used to establish both a validation criteria 122 for the entry and a transformation instruction 124 that may be followed to bring the entry in line with the validation criteria 122.

Example Data Ingestion Method

FIG. 3 is a flowchart of an example data ingestion method 300. The data ingestion system 100 may implement method 300 to extract data file 166 and generate table(s) 160 for analysis by the downstream data analysis utility 162 and/or storage in the downstream database 164.

At step 302, the user interface 112 receives a user input corresponding to responses 116 to questions 114 presented in the user interface 112. Examples of the questions 114 and responses 116 are described above. The responses 116 are generally provided to the data ingestion device 102 (e.g., via an appropriate push or pull action).

At step 304, the data ingestion device 102 generates ingestion parameters 118 based on responses 116, as described above. For each response 116, the data ingestion device 102 may generate one or more ingestion parameters 118. In general, the responses 116 may provide information related to the identity of the extracted data file 166 (e.g., information for generating the file identifier 120, which links the ingestion parameters 188 to the particular data file 166). The responses 116 also provide information related to the format and content of the data file 166 and the intended format and content of the table(s) 160 to be generated (e.g., information for generating validation criteria 122, transformation instructions 124, and/or storage instructions 126). As an example, each question 114 may be associated with a plurality of possible ingestion parameters to include in the generated ingestion parameters 118, and the response 116 to the question 114 may determine which one or more of the possible ingestion parameters to include in the generated ingestion parameters 118. For instance, a question 114 related to whether an entry does or does not store a time of day may be associated with the possible ingestion parameters of "not a time of day entry" and "time of day entry." The response 116 to this example question 114 will determine which of these possible ingestion parameters to include in the generated ingestion parameters 118. For instance, according to this illustrative example, if the response 116 corresponds to an identification of the entry as a time-of-day entry, an ingestion parameter 118 associated with the entry will be "time of day entry."

At step 306, data file 166 is extracted. For example, the ingestion device 102 may extract file 166 by sending a request to the landing zone 110 to collect the appropriate file (i.e., corresponding to the file identifier 120) from the upstream source 106. Responsive to the request, the landing zone provides the extracted data file 166 to the ingestion device 102. Upon or after receipt of the file 166, the data ingestion device 102 may decompress the extracted file 166 (e.g., if the file 166 is a compressed file). In some embodiments, the data ingestion device may also or alternatively extract data from database(s) associated with one or more of data 108a-c from the secondary data source 108. As such the extracted data file 166 may include information from one or more of the upstream files 106a-d and/or data 108a-c.

In some embodiments, the data file 166 may be extracted at step 306 automatically on a predefined schedule. For instance, the ingestion device 102 may store scheduling parameters (e.g., as scheduling data 414 of FIG. 4) associated with a frequency at which the data file 166 is to be automatically ingested. The ingestion device 106 may then automatically extract the data file 166 at the frequency associated with the scheduling parameters and automatically proceed through the subsequent steps of method 300 described below to generate and store data table(s) 160.

At step 308, the ingestion device 102 determines whether the extracted data file 166 is valid for ingestion using the validation criteria 122. For example, the device 102 may determine whether the file 166 is permitted to be ingested. For instance, the determination may be based on one or more of a format of the extracted file 166, a number of records in extracted file 166 (e.g., records 204, 206, 208 of FIG. 2), and/or whether extracted file 166 includes a header and/or trailer (e.g., header 202 and trailer 210 of FIG. 2).

If the validation criteria 122 are not satisfied for the file 166 at step 308, the method 300 may proceed to step 310. At step 310, the data ingestion device 102 may generate and transmit an error message for the extracted data file 1666. The message may be transmitted to a computing device associated with an administrator of the ingestion device 102 or any other entity associated with the extracted data file (e.g., an entity responsible for maintaining information in the upstream data source 106). The error message may be an electronic communication. The error message may include the file identifier 120 and any other related information, including but not limited to results of the validation performed (and failed) in step 308.

If the validation criteria 122 for the file 166 are satisfied at step 308, the method 300 proceeds to step 312 to evaluate the validity of each entry of the data file 166 (i.e., to evaluate the file 166 at the record level). For example, at step 312, the device 102 may determine, for each entry (e.g., entries 204a-d, 206a-d, and 208 a-d of FIG. 2), whether the entry is permitted to be ingested based on the validation criteria 122. For instance, the determination may be based on one or more of a format of the entry (e.g., compared to an entry format criteria 212 of FIG. 2), a number of characters in the entry (e.g., a length of the entry compared to an entry length criteria 214 of FIG. 2), and/or a type of characters in the entry (e.g., compared to a predefined permitted character type defined by the validation criteria 122). In other words, the ingestion device 102 determines whether the entries satisfy the validation criteria 122. The ingestion device 102 may determine that the validation criteria 122 are not satisfied if greater than a threshold number of the entries fail to satisfy the validation criteria 122 (e.g., if greater than 20% of the entries fail to satisfy the validation criteria 122). If the record is determined to be invalid, the device 102 may store an error entry for the record (at step 314) before proceeding to the next record of the file 166 (at step 316) and returning to step 312 to determine whether the next record is valid.

If the record is determined to be valid at step 312, the method 300 proceeds to step 318. At step 318, the data ingestion device 102 determines, for a first entry of the current record, a table of the one or more tables 160 in which to store the entry and a location (e.g., column and row) of the table in which to store the entry. This determination is based on the transformation instructions 124. For example, the transformation instructions 124 may specify a particular table in which to store certain entries of the extracted data file 166 and in which rows and columns of the table to store the entries. For example, for a given entry, the ingestion device 102 may identify corresponding transformation instructions 124 (e.g., based on the entry type and/or the format of the entry) and apply the transformation instructions to identify a corresponding table in which to store the entry. The same or related transformation instructions 124 may be used to determine in which row and column of the table to store the entry. Thus, the transformation instructions 124 ensure that information from the extracted data file 166 is assigned to the appropriate table locations (i.e., columns and rows) for more effective and efficient analysis of the data (e.g., using the downstream data analysis utility 162).

At step 320, the entry may be modified (e.g., reformatted) according to the transformation instructions 124 to facilitate improved downstream analysis. For example, if the original entry includes a date in a format that is not readable or that is not preferred by the downstream data analysis utility 162, the date may be reformatted to a preferred format. For example, a date in a format of "Month, DD, YYYY" may transformed into a date in the format of "MM/DD/YYYY," or any other appropriate format for a given application.

At step 322, the data ingestion device 102 inputs (e.g., writes) the entry (in its original format or as appropriately modified at step 320) in the table(s) 160 at the table, row, and column determined in step 318. For example, a new database may be generated (or a previous database may be accessed), and the device may write the entry in the determined table at the determined row and column.

At step 324, the device determines whether the final entry of the current record is currently being evaluated. If it is not the final entry, the method proceeds to the next entry (at step 326) and returns to step 318 to repeat steps 318, 320, 322, and 324 as appropriate until the final entry is reached. At step 328, the data ingestion device 102 determines if the current record is the final record of the file 166. If the record is not the final record, the method 300 proceeds to the next record (at step 316) and returns to step 312 to evaluate the next record. This process is repeated until the final record is reached at step 328.

After the final record of the file 166 is completed, the table(s) 160 are stored, at step 330, in a file or database format that is readable by the downstream data analysis utility 162 using the storage instructions 126. For example, the data ingestion device 102 may identify a database storage format in the storage instructions 126 that corresponds to the extracted file 166 and the, optionally, intended analyses to perform on data in the extracted file 166. The ingestion device 102 then stores the table(s) in the identified format. After the table(s) are stored in this format, information in the table(s) may be analyzed by the downstream data analysis utility 162 and/or stored in the downstream database 164.

Example Device for Implementing the Data Ingestion System

FIG. 4 is an embodiment of a device 400 configured to implement the data ingestion system 100. The device 400 comprises a processor 402, a memory 404, and a network interface 406. The device 400 may be configured as shown or in any other suitable configuration. The device 400 may be and/or may be used to implement any one or more of the data ingestion device 102, the landing zone 110, and the user interface 110 of FIG. 1.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of method 200. In an embodiment, the function described herein is implemented using logic units, FPGAs, ASICs, DSPs, or any other suitable hardware or electronic circuitry.

The memory 404 is operable to store ingestion parameters 118, table(s) 160, database 164, extracted data file(s) 408, user interface data 410, ingestion history logs 412, scheduling data 414, alert instructions 416, data analysis instructions 418, landing zone instructions 420, and/or any other data or instructions. The ingestion parameters 118, table(s) 160, database 164, extracted data file(s) 408, user interface data 410, ingestion history logs 412, scheduling data 414, alert instructions 416, data analysis instructions 418, and landing zone instructions 420, may comprise any suitable set of instructions, logic, rules, or code operable to execute the function described herein. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The extracted data file(s) 408 includes but are not limited to extracted file 166. For instance, the extracted data file(s) 408 may include other (e.g., previously) extracted data files.

The extracted data files 408 may include any one or more of the upstream files 106a-d and/or the data 108a-c.

The user interface data 410 includes any instructions, logic, rules, or code operable to execute the user interface 112. For instance, the user interface data 410 includes a list of the questions 114 presented in the user interface 112. The user interface data 410 may also include instructions for presenting the questions 114. For instance, the instructions may be used to determine which question 114 to present subsequent to a particular response 116 to a previous question 114.

The ingestion history logs 412 may include a record of activities performed by the device 400 (e.g., by the data ingestion device 102). The scheduling data 414 generally includes. As described above, the scheduling data 414 may be based on responses 116 to schedule-related questions 114 presented in the user interface 112 of FIG. 1. The alert instructions 416 generally include any instructions, logic, rules, or code operable to transmit any alerts by the device 400. For instance, the alert instructions may facilitate the transmission of an error message (e.g., at step 310 of method 300, described above). The data analysis instructions 418 may include any instructions, logic, rules, or code operable to execute the data analysis utility 162 of FIG. 1. The landing zone instructions 420 may include any instructions, logic, rules, or code operable to execute the landing zone 110 of FIG. 1.

The network interface 406 is configured to enable wired and/or wireless communications (e.g., via network 104). The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for automatically ingesting a data file, the system comprising:
a first hardware processor configured to:
extract, based on ingestion parameters, the data file from an upstream source, the data file comprising a plurality of data records, each record comprising one or more entries, wherein the data file is in a first format that is not readable by a downstream data analysis utility, wherein the ingestion parameters comprise:
an identifier of the extracted data file;
transformation instructions for the extracted data file, the transformation instructions comprising one or more parameters for transforming the extracted data file into one or more data tables; and
storage instructions for the extracted data file, the storage instructions comprising one or more parameters for storing the one or more data tables in a second format that is readable by the downstream data analysis utility; and
send the extracted data file to a second hardware processor;
the second hardware processor configured to:
receive the extracted data file from the first hardware processor;
generate the one or more data tables based on each record of the extracted data file by, for each record:
for each entry of the record, determining, based on the transformation instructions, a table of the one or more tables in which to store the entry;
for each entry of the record, determining, based on the transformation instructions, a row and column of the determined table in which to store the entry; and
for each entry of the record, inputting the entry in the determined table, row, and column; and
store, based on the storage parameters, the one or more tables in the second format.

2. The system of claim 1, wherein the ingestion parameters are generated and associated with the extracted data file, based on user input provided in a user interface presented on a display of a device communicatively coupled to the second hardware processor, wherein the user input comprises responses to a plurality of questions associated with content of the extracted data file and the second format that is readable by the downstream data analysis utility.

3. The system of claim 1, wherein the second hardware processor is further configured to determine, for each entry, whether the entry is permitted to be ingested based on one or more of a format of the entry, a number of characters in the entry, and a type of characters in the entry.

4. The system of claim 3, wherein the second hardware processor is further configured to, responsive to a determination that the record is not permitted to be ingested, perform one or both of transmitting a notification to an administrator of the device and terminating processes performed by the device such that the one or more data tables are not stored.

5. The system of claim 1, wherein the ingestion parameters further comprise scheduling parameters associated with a frequency at which the data file is to be automatically ingested; and
wherein the second hardware processor is configured to:
automatically extract the data file at the frequency associated with the scheduling parameters;
automatically generate the one or more data tables based on each record of the automatically extracted data file; and
automatically store the one or more automatically generated tables in the second format.

6. The system of claim 1, wherein the first format is a compressed file format; and
wherein the second hardware processor is configured to decompress the extracted data file prior to generating the one or more data tables.

7. The system of claim 1, wherein the extracted data file is a compressed mainframe file, a position-based file, a comma-delimited file, or a tab-delimited file.

8. A method for automatically ingesting a data file, the method comprising:
extracting, based on ingestion parameters, the data file from an upstream source, the data file comprising a plurality of data records, each record comprising one or more entries, wherein the data file is in a first format that is not readable by a downstream data analysis utility, wherein the ingestion parameters comprise:
an identifier of the extracted data file;
transformation instructions for the extracted data file, the transformation instructions comprising one or more parameters for transforming the extracted data file into one or more data tables; and
storage instructions for the extracted data file, the storage instructions comprising one or more parameters for storing the one or more data tables in a second format that is readable by the downstream data analysis utility;
generating the one or more data tables based on each record of the extracted data file by, for each record:
for each entry of the record, determining, based on the transformation instructions, a table of the one or more tables in which to store the entry;
for each entry of the record, determining, based on the transformation instructions, a row and column of the determined table in which to store the entry; and
for each entry of the record, inputting the entry in the determined table, row, and column; and
storing, based on the storage parameters, the one or more tables in the second format.

9. The method of claim 8, wherein the ingestion parameters are generated and associated with the extracted data file, based on user input provided in a user interface presented on a display of a device communicatively coupled to the device, wherein the user input comprises responses to a plurality of questions associated with content of the extracted data file and the second format that is readable by the downstream data analysis utility.

10. The method of claim 8, further comprising determining, for each entry, whether the entry is permitted to be ingested based on one or more of a format of the entry, a number of characters in the entry, and a type of characters in the entry.

11. The method of claim 10, further comprising, responsive to determining that the record is not permitted to be ingested, performing one or both of transmitting a notification to an administrator of the device and terminating processes performed by the device such that the one or more data tables are not stored.

12. The method of claim 8, wherein the ingestion parameters further comprise scheduling parameters associated with a frequency at which the data file is to be automatically ingested; and the method further comprising:
automatically extracting the data file at the frequency associated with the scheduling parameters;
automatically generating the one or more data tables based on each record of the automatically extracted data file; and
automatically storing the one or more automatically generated tables in the second format.

13. The method of claim 8, wherein the first format is a compressed file format; and the method further comprises decompressing the extracted data file prior to generating the one or more data tables.

14. The method of claim 8, wherein the extracted data file is a compressed mainframe file, a position-based file, a comma-delimited file, or a tab-delimited file.

15. A device for automatically ingesting a data file, the device comprising:
a memory storing instructions and a hardware processor coupled to the memory, wherein the instructions when executed by the processor cause the hardware processor to:
extract, based on ingestion parameters, the data file from an upstream source, the data file comprising a plurality of data records, each record comprising one or more entries, wherein the data file is in a first format that is not readable by a downstream data analysis utility, wherein the ingestion parameters comprise:
an identifier of the extracted data file;
transformation instructions for the extracted data file, the transformation instructions comprising one or more parameters for transforming the extracted data file into one or more data tables; and
storage instructions for the extracted data file, the storage instructions comprising one or more parameters for storing the one or more data tables in a second format that is readable by the downstream data analysis utility;
generate the one or more data tables based on each record of the extracted data file by, for each record:
for each entry of the record, determining, based on the transformation instructions, a table of the one or more tables in which to store the entry;
for each entry of the record, determining, based on the transformation instructions, a row and column of the determined table in which to store the entry; and
for each entry of the record, inputting the entry in the determined table, row, and column; and
store, based on the storage parameters, the one or more tables in the second format.

16. The device of claim 15, wherein the ingestion parameters are generated and associated with the extracted data file, based on user input provided in a user interface presented on a display of a device communicatively coupled to the device, wherein the user input comprises responses to a plurality of questions associated with content of the extracted data file and the second format that is readable by the downstream data analysis utility.

17. The device of claim 15, wherein the instructions, when executed, cause the hardware processor to determine, for each entry, whether the entry is permitted to be ingested based on one or more of a format of the entry, a number of characters in the entry, and a type of characters in the entry.

18. The device of claim 17, wherein, the instructions, when executed, cause the hardware processor to, responsive to a determination that the record is not permitted to be ingested, perform one or both of transmitting a notification to an administrator of the device and terminating processes performed by the device such that the one or more data tables are not stored.

19. The device of claim 15, wherein the ingestion parameters further comprise scheduling parameters associated with a frequency at which the data file is to be automatically ingested; and wherein, the instructions, when executed, cause the hardware processor to:
automatically extract the data file at the frequency associated with the scheduling parameters;
automatically generate the one or more data tables based on each record of the automatically extracted data file; and
automatically store the one or more automatically generated tables in the second format.

20. The device of claim 15, wherein the first format is a compressed file format; and the instructions, when executed, cause the hardware to decompress the extracted data file prior to generating the one or more data tables.

\* \* \* \* \*